Sept. 4, 1951 T. E. DAVIES 2,566,697
MACHINE FOR FACING TAPERED WORKSHOP ELEMENTS
OF VARYING TAPERS AND WIDTHS
Filed Feb. 12, 1948 5 Sheets-Sheet 3

INVENTOR
Thomas Ellis Davies
by Benj. T. Rauber
his attorney

Sept. 4, 1951 T. E. DAVIES 2,566,697
MACHINE FOR FACING TAPERED WORKSHOP ELEMENTS
OF VARYING TAPERS AND WIDTHS
Filed Feb. 12, 1948 5 Sheets-Sheet 4

INVENTOR
Thomas Ellis Davies
by Benj. T. Rauber
his attorney

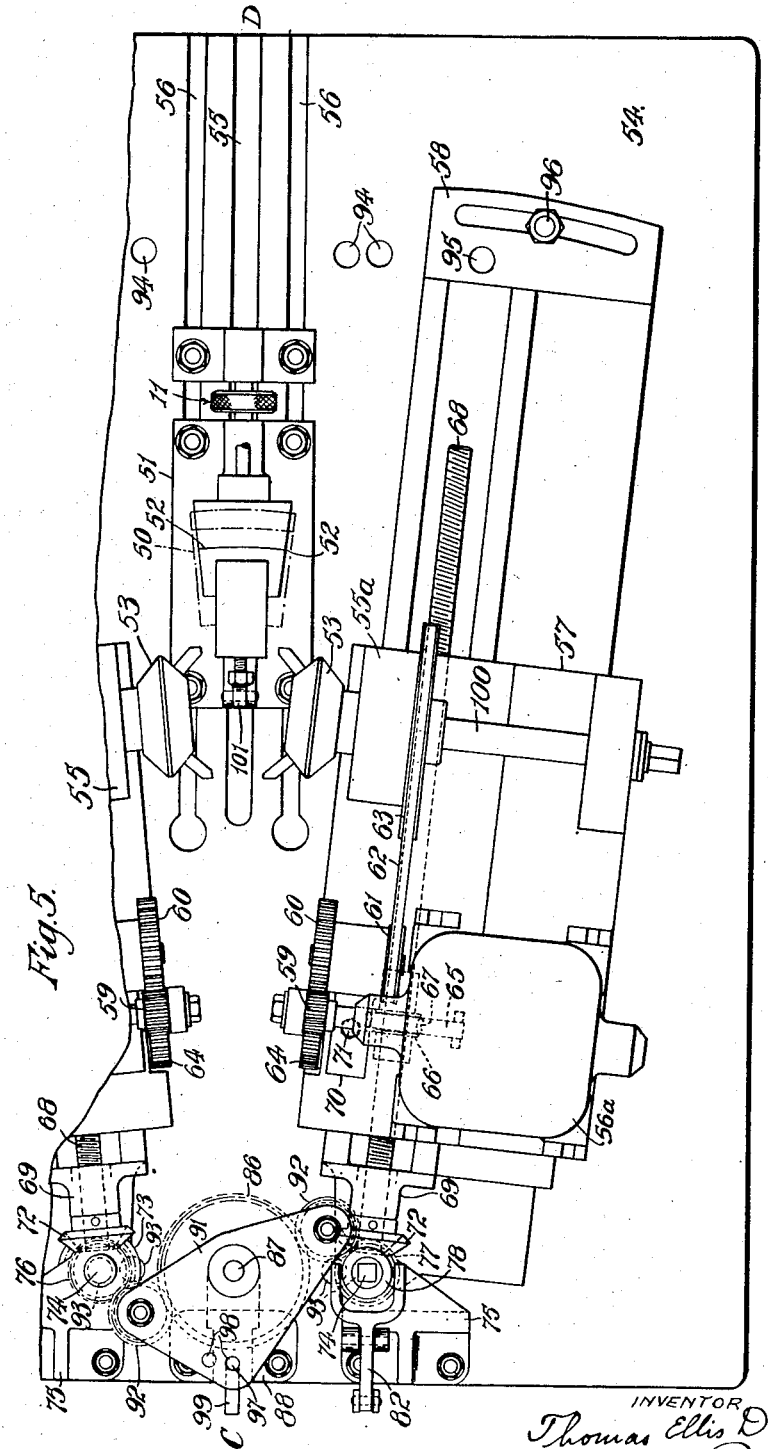

Patented Sept. 4, 1951

2,566,697

UNITED STATES PATENT OFFICE 2,566,697

MACHINE FOR FACING TAPERED WORK-
SHOP ELEMENTS OF VARYING TAPERS
AND WIDTHS

Thomas Ellis Davies, Birmingham, England, assignor to Dunlop Rubber Company Limited, London, England, a British company Application February 12, 1948, Serial No. 7,836
In Great Britain January 21, 1947

Section 1, Public Law 690, August 8, 1946
Patent expires January 21, 1967

5 Claims. (Cl. 90—17)

1

This invention provides a machine for facing the diverging sides of tapered workshop elements of varying tapers and varying widths, and more particularly for facing the diverging sides of tapered segments which are subsequently assembled and fixed side-by-side in one half of a mould for a rubber tyre, to provide the pattern of said mould.

Tapered workshop elements, including segments for moulds of different sizes and having different patterns, necessarily vary considerably in taper and with and it is the object of this invention to provide a comparatively compact machine which can be readily adjusted to face a range of elements or segments.

According to the invention a machine for facing the diverging sides of tapered workshop elements of varying tapers and varying widths comprises a frame, a member adapted to be angularly adjusted a predetermined amount relative to the frame and laterally displaced a predetermined distance relative to the main axis of the frame, a slide mounted on the said member, rotatable cutter means mounted on the said slide, driving means for the said rotatable cutter means, and driving means for the said slide, such driving means being operative for any angular position and any lateral displacement of the said member within the predetermined ranges.

Preferably according to the invention a machine for simultaneously facing the diverging sides of tapered workshop elements of varying tapers and varying widths comprises a frame, a member on each side of the main axis of the said frame adapted to be angularly adjusted a predetermined amount relative to the frame and laterally displaced a predetermined distance relative to said main axis, a slide mounted on each of the said members, rotatable cutter means mounted on each of the said slides, driving means for each of the said rotatable cutter means, and driving means for the said slides, such driving means being operative for any angular position and any lateral displacement of the said members within the predetermined ranges.

The invention will now be more particularly described with reference to the accompanying drawings illustrating two machines each adapted for simultaneously facing the diverging sides of a tapered segment for use in a mould for rubber tyres.

Fig. 5 is a fragmentary plan of Fig. 4 showing, for convenience, only one slide and its associated mechanism in full.

Figure 1:
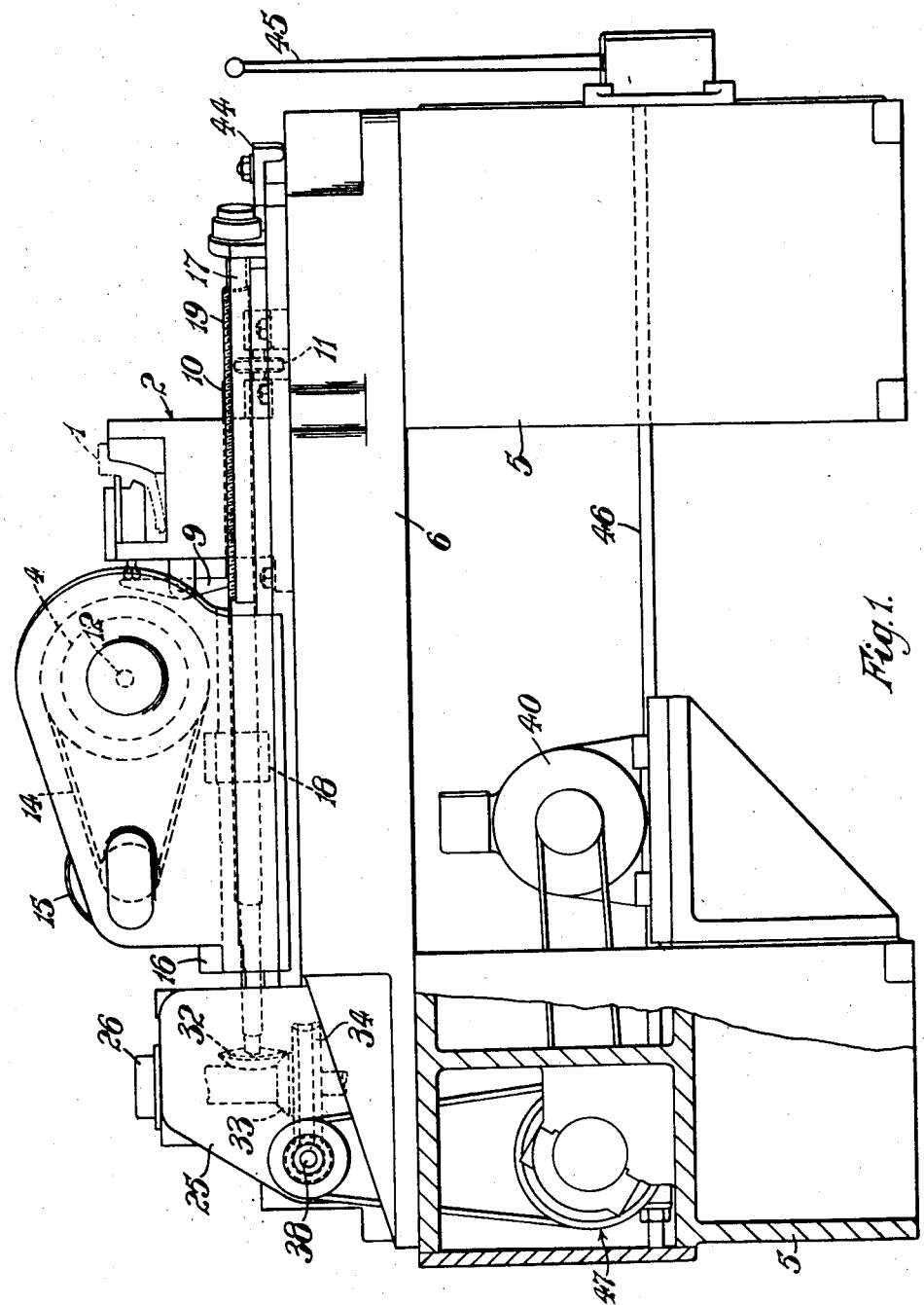
Fig. 1 is a side view of a machine constructed in accordance with the preferred form of the invention, the parts of the machine being in positions attained prior to the machining operation on the segment.
Figure 2:
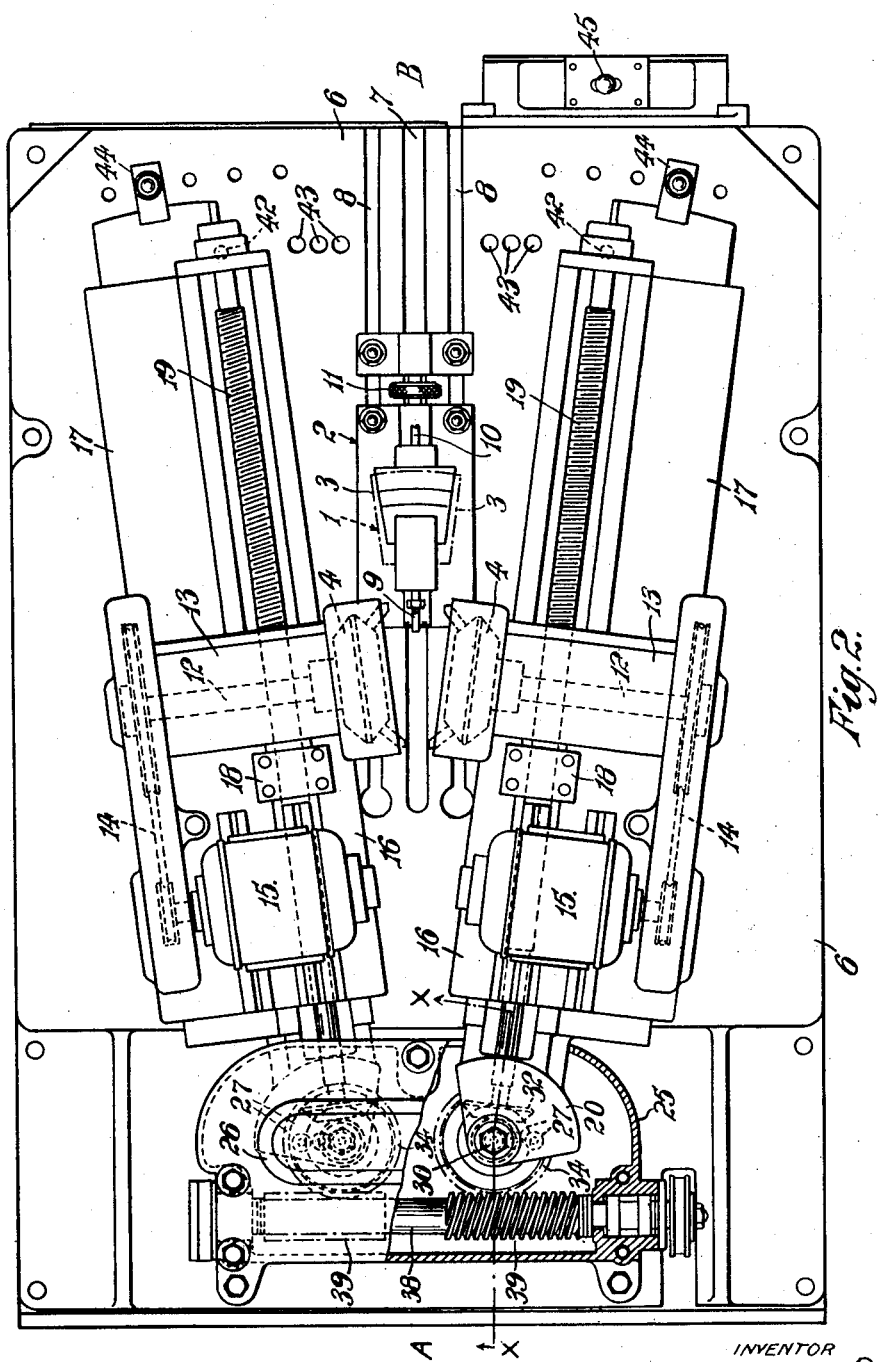
Fig. 2 is a part sectional plan of Fig. 1.
Figure 3:
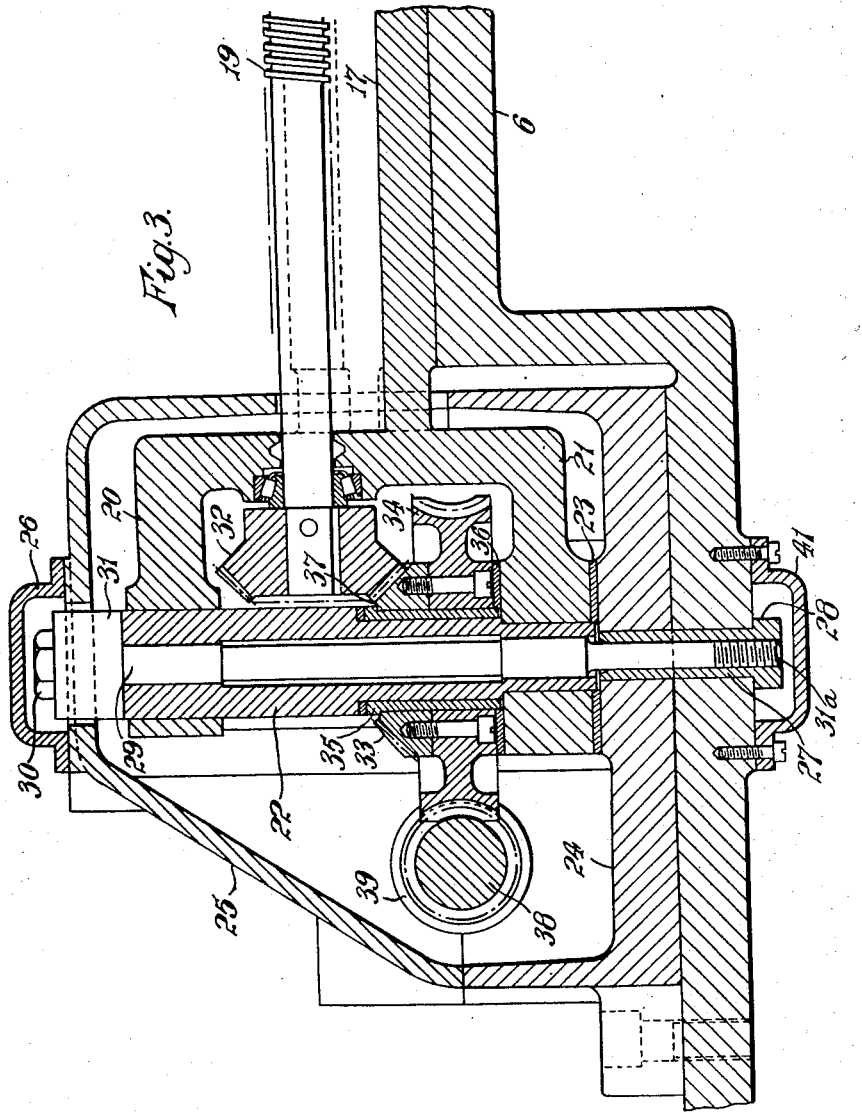
Fig. 3 is sectional side elevation on an enlarged scale and taken on the dotted lines X—X of Fig. 2.

Referring to Figs. 1 to 3 the segment 1 is rigidly held in a support 2 so that its diverging sides 3 can be machined by rotary cutter heads 4 adapted to be traversed relatively to said segment.

The machine comprises a frame consisting of two spaced-apart legs 5 and a rectangular bed 6 resting on and bolted to said legs. The upper face of the bed is planed and has a central tenon slot 7 on the main axis A—B of the machine, and two T-slots 8 which extend parallel with and one each side of the tenon slot, said T-slots being engaged by T-bolts carried by the segment support 2 to secure said support rigidly to the bed in any suitable position along the main axis. The support has vice jaws to grip the segment said jaws being operable by a lever 9 and push rod 10 from hand operated toggle means (not shown), also said support has fine adjustment means 11 for the purpose hereinafter referred to.

On one side of the main axis the mechanism is substantially a replica of the mechanism on the other side of the axis so that as far as possible one side only is hereinafter described as being representative of both.

The rotary cutter head 4 is mounted on a horizontal spindle 12 supported in suitable bearings in a housing 13 said spindle being driven by belt means 14 from an electric motor 15. The spindle housing and electric motor form part of a slide 16 which can be horizontally traversed in a substantially longitudinal direction of the machine on a member 17 supported on the machine bed in a movable manner, said slide having a nut 18 which engages a lead screw 19 mounted in tapered roller bearings located in the ends of the member.

The member at its one end has two arms 20 and 21 through which passes and is secured by a drive-fit, a vertical sleeve 22 whose lower end projects slightly below the lower face of the arm 21 to form a register for a bearing washer 23 located between said lower face and a machined upper face of a base 24 which forms part of a box-like cover 25 bolted in a fixed position to the head end of the machine bed, said cover having a removable top plate 26 for a purpose to be hereinafter described.

Three vertically disposed bushes 27, only one of which is shown in Fig. 3 and another indicated in Fig. 2, pass through openings, the base of the cover and the machine bed, against the underside of which a shoulder 28 on each of the bushes abuts, said bushes being equally spaced apart on a transverse axis of the machine and being grouped on one side of the main axis. A plug 29 has a nut formation 30 at its upper end and a shoulder 31 which bears against the upper end of the sleeve and said plug passes through the bore of said sleeve and makes a good slide-fit engagement therewith, and at its lower end passes into and engages with a good slide-fit the bore of any pre-selected plug bush. The bores of the bushes are screw-threaded at their lower ends to co-operate with the screw-threaded lower end 31a of the plug. The one end of the member is therefore anchored to the bed in a manner allowing for its adjustment in a horizontal plane both angularly, and, according to which bush is engaged, also laterally.

One end of the lead screw projects between the two arms of the member and to this end is rigidly secured a driven bevel wheel 32 meshing with a driving bevel wheel 33 secured concentrically to a worm wheel 34 to form a unit which is rotatably mounted on a bearing bush 35 secured by a drive-fit to the exterior of the sleeve. To locate the unit against axial movement its lower face bears against a thrust washer 36 which abuts against the upper face of the arm 21, while the upper face of said unit bears against a shoulder 37 formed on the bearing bush.

Disposed transversely of the machine in a horizontal plane is a worm shaft 38 supported in suitable bearings in the cover, said shaft being formed with two worm portions 39 disposed equally one each side the main axis and each engaged by one of the worm wheels 34, each portion being sufficiently long to allow of adjustment of the position of the worm wheel as described below. The worm shaft 18 is driven by belt means from an electric motor 40 through any suitable motion transmitting means 47 such that the shaft can be rotated in either direction and preferably at different speeds said means being coupled to a manually operable control lever 45 by a rod 46.

The cover 25 substantially encloses the arms at the end of the table, bevel gears, worm wheel and worm, so that an oil bath for the gearing is provided, a dished plate 41 being applied to the underside of the bed adjacent the bushes to prevent egress of oil through the bushes not being used.

Rigidly secured to the end of each member remote from the arms is a vertically disposed circular setting stud 42, and the bed, at this tail end and on each side of the fixed axis, is provided with three holes 43 corresponding to the three bushes 27 and in similar relationship to the main axis as said bushes. Clamping means 44 are also provided at this end of the bed to co-operate with and lock the member in its desired position.

When it is desired to set the machine to face the diverging sides of a segment, the top plate 26 of the cover 25 is removed and the screw-threaded ends of the plugs 29 are manually withdrawn into the sleeves 22 and, with the clamps 44 loosened, the members 17 are each moved laterally until the respective plug 29 is coincident with the bush 27 with which it is necessary to engage and be secured by the screw-action. The top plate of the cover can then be replaced and fixed. During this movement of each member the respective worm wheel 34 rolls along its associated worm portion 39, which as before described is of sufficient length for this purpose. For each member in turn, a setting plug (not shown) is inserted into a hole 43 at the tail end of the bed, said hole corresponding in position to the bush which the plug 29 engages at the head end of the bed, and a slip gauge of predetermined length is placed against the periphery of said setting plug and the member is angularly adjusted about the plug 29 until its setting stud 42 abuts against the slip gauge. The respective clamp 44 is then tightened to secure the member in its adjusted position. Dependent upon the width of the segment 1, the slides 16 carrying the cutter heads 4 are traversed to suitable positions on their members 17, the segment support 2 is moved to an approximately correct position in relation to the cutters, and the fine adjustment means 11 is then used to move said support in either direction along the main axis to obtain the correct position.

The machine operates as follows from the position shown in the drawings. The lever 45 is rocked to one side of its mid-position to operate switches (not shown) whereby the motors 15 are energised to rotate the cutter heads 4. A further switch (not shown) is also simultaneously operated to energise the motor 40 so that rotary motion in the desired direction is transmitted through the means 47, which has also been actuated by the rod 46, to rotate the lead screws 19 and effect a feed traverse which is suitably slow. When the sides 3 have been faced by the cutter heads 4 the lever 45 is manually moved to its mid-position to de-energise the motors 15 and 40. The lever 45 is then manually moved to its other side position to again energise the motor 40 and actuate the means 47 so that rotary motion is transmitted through said means 47 in a reverse direction at a greater speed than before to rotate the lead screws 19 and effect a quick return traverse of the cutter heads 4. When the cutter heads are clear of the support the lever is moved to its mid-position to de-energise the motor 40 and so stop the return traverse, and the machined segment can then be removed from said support.

In a further embodiment of the invention (not illustrated) each lead screw, instead of having a bevel wheel mounted on its one end, is provided with a worm wheel secured at said end, said worm-wheel meshing with a vertically disposed worm mounted to rotate freely around a sleeve such as before described, said worm being rigidly secured in concentric relation to a bevel wheel which meshes with a bevel wheel splined on a transverse driving shaft to be axially slidable thereon and allow of lateral adjustment of the member, the other features of the machine being in main substantially as described in relation to the other embodiment.

Figure 4:
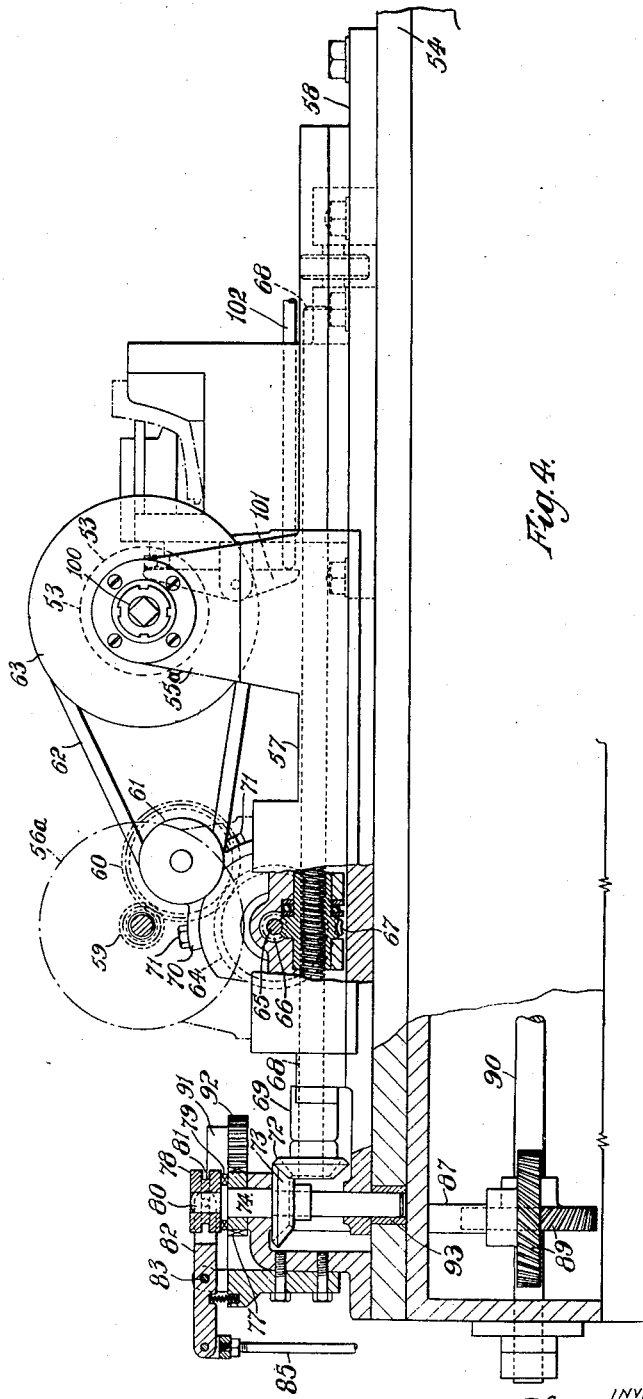
Fig. 4 is a part sectional side view of the alternative form of machine, the parts of which are in positions attained prior to the machining operation on the segment.

Referring to Figs. 4 and 5 the segment 50 having diverging sides 52 is rigidly held by vice jaws provided in a support 51, said jaws being operable by a lever 101 and push rod 102 from hand operated toggle means (not shown). Fine adjustment means 103 are also provided on the support for a purpose hereinafter referred to.

The machine comprises a frame having a horizontal bed 54 mounted on suitable legs and the upper face of said bed is planed and has a central tenon slot 55 on the main axis C—D of the machine, and two T-slots 56 which extend parallel with and one each side of the tenon slot, said T-slots being used for securing the segment support to the bed at any suitable position along the main axis.

On one side of the main axis the mechanism is in part a replica of the mechanism on the other side of the axis so that as far as possible one side only is described as being representative of both.

A rotatable cutter head 53 is mounted on a horizontal spindle 100 supported in suitable bearings in upright arms 55ᵃ, said spindle being driven by an electric motor 56ᵃ as hereinafter described. The upright arms form part of a slide 57 on which said motor is mounted, said slide being mounted on a member 58 supported on the machine bed in a movable manner, the spindle 100 being disposed transversely of the direction of movement of said slide. A driving pinion 59 is keyed to the motor shaft and meshes with an intermediate pinion 60 directly coupled to a coaxial pulley 61 engaged by a belt 62 also passing around a pulley 63 keyed to the spindle 100. Meshing with the intermediate pinion 60 is a driven spur wheel 64 keyed to a shaft 65 mounted in bearings in the slide, and on said shaft is formed a worm 66 engaging with a worm-wheel 67 which constitutes a nut axially supported by said slide and engaging a lead-screw 68. Said spur wheel and pinions are suitably enclosed in a casing (not shown). The lead screw is supported by the nut and by a bearing 69 secured to the member. In order to take up any slack which develops in the belt 62 the motor 56ᵃ is adjustable on the slide 57 and the intermediate pinion 60 is supported by a pedestal 70 adjustable in an arcuate path around the axis of the driven spur wheel 64 and secured to the slide in its adjusted position by bolts 71.

To one end of the lead-screw is keyed a toothed bevel wheel 72 which meshes with a bevel wheel 73 keyed to a vertical stub shaft 74 disposed on one side of the main axis and supported by the bed at its lower end and supported at its upper end by an upstanding bracket 75 secured to the upper face of said bed. Intermediate its ends the stub shaft passes through the member 58 in a manner allowing said member to be angularly adjusted around said stub shaft.

From the foregoing description it should be appreciated that there are two stub shafts 74 one each side the main axis. One of said stub-shafts has a driven gear wheel 76 secured thereto so that said stub-shaft, driven pinion, and the associated bevel wheel rotate as a one-piece part. The other stub-shaft has freely mounted thereon a driven gear wheel 77 provided on its upper face with dog teeth adapted to engage, except when hereafter stated, corresponding teeth formed on a collar 78 thereby to form a clutch 79 between said driven gear wheel 77 and collar 78. The bore of the collar is of square cross-section and slidably engages a squared end 80 of the stub-shaft to provide a driving engagement, said collar being formed in its periphery with an annular groove 81 engaged by a bifurcated lever 82 adapted to be rocked about its fulcrum 83 by a link 85 from a treadle mechanism (not shown) to operate said dog clutch. Mid-way between the two stub-shafts coincident with the main axis, is disposed a driving gear wheel 86 disposed above the bed and keyed to a vertically disposed driving shaft 87 supported in a bracket 88 fixed to the bed, said shaft passing through the bed and being coupled by spiral gears 89 to a shaft 90 driven by an electric motor (not shown) located underneath said bed. Disposed above the bed and mounted to rock about the vertical driving shaft is a carrier arm 91 having two idler wheels 92 mounted thereon, said idler wheels being diametrically opposite each other with respect to the axis of the arm and each being in constant mesh with the driving gear wheel 86. The idler wheels 92 are adapted to be swung into and out of engagement with the driven gear wheels 76 and 77 for a purpose to be hereinafter described by rocking the arm about its axis.

The stub-shafts 74 are disposed at what will be termed the head end of the machine and at said head end, on each side of the main axis, there are provided two vertical holes 93 in the machine bed said holes being spaced apart on a traverse axis of the machine, and the appropriate stub-shaft is rotatably secured in either of the said holes. Each member 58 is therefore anchored at its one end to the head end of the bed in a manner allowing for its adjustment in a horizontal plane both angularly, and, according to which holes is engaged by the respective stub-shaft, also laterally. At the tail end of the machine the bed is provided on each side of the main axis, with two vertical holes 94 corresponding in transverse position with the two holes 93 at the head end of the machine on the same side of the main axis. The end of each member remote from its anchorage is provided with a vertical hole 95 adapted to receive a setting plug (not shown), and clamping means 96 are located at this end of the bed to co-operate with and lock the member in its required position.

When it is desired to set the machine to face the diverging sides of a segment the brackets 75, carrying the stub-shafts 74, are bolted to the bed 54 in positions such that said stub-shafts engage the correct holes 93 in said bed. If the stub-shafts 74 are engaged with the holes 93 nearest the main axis the driven gear wheels 76 and 77 mesh directly with the driving gear wheel 86, and the idler wheels 92 are disengaged from said driven gear wheels by moving the carrier arm 91 about its axis. If the stub shafts are engaged with the holes remote from the main axis the driven gear wheels 76 and 77 are disengaged from the driving gear wheel and the arm is moved about its axis so that the idler wheels 92 mesh also with the said driven gear wheels 76 and 77 to transmit motion from the said driving gear wheel. The carrier arm 91 is maintained in either position by a bolt 97 which engages either of two holes 98 in the arm, said bolt being mounted in the bracket 88 to slide in a vertical direction when actuated by a handle 99 attached to said bolt. For each table in turn, a setting plug (not shown) is inserted into a hole 94 at the tail end of the bed, said hole corresponding in position to the hole which the respective stub shaft engages at the head end of the bed, and a setting plug is inserted into the hole 95 in the member 58. A slip gauge (not shown) of predetermined length is then placed against the plug in the bed and the member is angularly adjusted about its stub shaft until the plug in the member abuts against the slip gauge, during this angular adjustment the associated bevel wheels roll one over the other. The respective clamping means are then tightened to secure the members in their adjusted positions. Dependent upon the width of the segment, the slides carrying the cutter heads are traversed to suitable positions on their members in a manner as hereinafter described, the segment support is moved to an approximately correct position in relation to the cutter heads, and the fine adjustment is then used to move said support in either direction along the main axis to obtain the correct position relative to the cutter heads.

The operation of the machine is controlled by manually operable switches (not shown), one of which controls the two electric motors 56ᵃ each adapted to rotate a cutter head 53 and a nut 67. Another switch controls the motor adapted to rotate the lead screws 68, and a reversing switch is also connected to said motor in order that the lead screws can be rotated in the required direction irrespective of whether or not the idler wheels 92 are used to transmit motion from said motor to said lead screws.

It should be appreciated that during operation of the machine the two motors which rotate the cutter heads 53 also rotate the nuts around their respective stationary lead screws to traverse the slides 57 and cutter heads along their respective tables 54 at a suitable cutting feed. The return traverse of the slides and cutter heads is effected at a relatively increased speed by switching off the motors 56ᵃ and switching on the motor to rotate the lead screws in their respective nuts which are prevented from rotation by the stationary worms 66.

As the cutter heads are traversed during the feed motion by the two independent motors 56ᵃ, it is probable that after a period of use the one cutter head becomes slightly advanced along its member relatively to the other cutter head on its member owing to the two motors running at speeds which differ infinitesimally. In order to re-position the cutter heads correctly the dog clutch 79 is disengaged and the motor adapted to rotate the lead screws is switched on in the desired direction thereby to rotate one lead screw and traverse the respective cutter head the requisite distance necessary for correct positioning relative to the other cutter head.

Having described my invention, what I claim is:

1. A machine for simultaneously facing the diverging sides of tapered workshop elements of varying tapers and varying widths comprising a frame, a support for said elements attached to said frame with its axis coinciding with the main axis of the frame, a member on each side of said main axis, each said member being angularly adjustable and laterally displaceable relative to said axis, a slide mounted on each of said members, a screw means associated with each slide, a lead screw carried on each member and engaging with its respective screw means whereby on relative rotation of said screw and screw means each said slide is traversed along said screw, rotatable cutter means mounted on each of said slides, driving means for each of said cutter means and driving means for said lead screws, a common motive power for said driving means, such means being operative in any angular position and lateral displacement of the members within a predetermined range, the driving means for the lead screws comprising a worm shaft having two worm portions, one portion for each lead screw, and driven by the source of motive power, worm wheels one for each portion of said worm shaft and driven thereby and pairs of bevel wheels one pair for each said worm wheel and meshing therewith, one bevel wheel being co-axial with and driven by the said worm wheel and the other bevel wheel being co-axial with and driving a lead screw.

2. A machine as claimed in claim 1 which comprises a reversing mechanism interposed between the source of motive power and the said worm shaft adapted to cause the lead screws to rotate and the slides to traverse quicker during the return stroke than during the cutting stroke.

3. A machine as claimed in claim 1 wherein the said worm wheels rotate on plugs adapted to fit in holes in the said frame and the frame has a set of holes for selective engagement by each plug, said holes being spaced apart on an axis parallel to the axis of the said worm shaft so that the worm wheels gear correctly with the worm shaft in any position of the said plugs, and the frame has corresponding holes at the ends of the adjustable members remote from the said plug holes.

4. A machine for simultaneously facing the diverging sides of tapered workshop elements of varying tapers and varying widths comprising a frame, a support for said elements attached to said frame with its axis coinciding with the main axis of the frame, a member on each side of said main axis, each said member being angularly adjustable and laterally displaceable relative to said axis, a slide mounted on each of said members, a screw means associated with each slide, a lead screw carried on each member and engaging with its respective screw means whereby on relative rotation of said screw and screw means each said slide is traversed along said screw, rotatable cutter means mounted on each of said slides, driving means for each of said cutter means and driving means for said lead screws, a common motive power for said driving means, such means being operative in any angular position and lateral displacement of the members within a predetermined range, the driving means for the lead screws comprising a driving gear wheel driven from the source of motive power, a carrier arm rotatably mounted about the axis of said gear wheel and carrying a pair of idler wheels in constant mesh therewith, a pair of stub shafts each carrying a driven gear wheel adapted to mesh with an idler wheel or with said driving gear wheel, and a pair of intermeshing bevel wheels associated with each driven gear wheel, one bevel wheel being co-axial with and driven by the said driven gear wheel and the other bevel wheel being co-axial with and driving a lead screw.

5. A machine as claimed in claim 4 wherein each lead screw engages with a nut associated with a slide, said nut being rotatable by a worm wheel and worm shaft, the worm wheel being integral with the said nut and the worm shaft driven through gearing from an independent source of motive power mounted on the said slide, whereby motion of the slide in one direction is effected by rotating the lead screw relative to the nut and in the reverse direction by rotating the nut relative to the lead screw.

THOMAS ELLIS DAVIES.

REFERENCES CITED

The following references are of record in the file of this patent:

UNITED STATES PATENTS

| Number | Name | Date |
| --- | --- | --- |
| 1,520,219 | Barnes | Dec. 23, 1924 |